(12) United States Patent
Peng

(10) Patent No.: US 10,779,662 B2
(45) Date of Patent: Sep. 22, 2020

(54) DISPLAY RACK FOR DISPLAY AND EXHIBITION AND DISPLAY DEVICE

(71) Applicant: Shenzhen X-LIVE Electronics Co., Ltd., Shenzhen, Guangdong (CN)

(72) Inventor: Dongmeng Peng, Guangdong (CN)

(73) Assignee: Shenzhen X-LIVE Electronics Co., Ltd., Shenzhen (CN)

( * ) Notice: Subject to any disclaimer, the term of this patent is extended or adjusted under 35 U.S.C. 154(b) by 0 days.

(21) Appl. No.: 16/423,207

(22) Filed: May 28, 2019

(65) Prior Publication Data

US 2020/0046144 A1 Feb. 13, 2020

Related U.S. Application Data

(63) Continuation-in-part of application No. PCT/CN2018/103552, filed on Aug. 31, 2018.

(30) Foreign Application Priority Data

Aug. 9, 2018 (CN) ............. 2018 2 1287469 U

(51) Int. Cl.
*A47F 5/10* (2006.01)
*F16B 5/02* (2006.01)
*G09F 7/08* (2006.01)
*A47F 5/02* (2006.01)
*F16B 5/06* (2006.01)

(52) U.S. Cl.
CPC ............. *A47F 5/10* (2013.01); *A47F 5/02* (2013.01); *F16B 5/02* (2013.01); *F16B 5/0607* (2013.01); *G09F 7/08* (2013.01)

(58) Field of Classification Search
CPC .. A47F 5/10; A47F 5/02; F16B 5/0607; F16B 5/02; F16B 45/00; F16B 2200/20; G09F 7/08
See application file for complete search history.

(56) References Cited

U.S. PATENT DOCUMENTS

| 1,382,092 | A | * | 6/1921 | Kilmer | ............ | A47F 1/08 |
| | | | | | | 312/42 |
| 1,676,356 | A | * | 7/1928 | Sapinsley | ........ | A47F 3/02 |
| | | | | | | 312/42 |

(Continued)

FOREIGN PATENT DOCUMENTS

CN 104687871 A 6/2015
CN 207506288 U 6/2018

*Primary Examiner* — Ko H Chan

(57) ABSTRACT

The present invention discloses a display rack for display and exhibition. The display device includes the display rack. Both sides of the display rack are provided with at least one insertion plate and insertion slot respectively, and the outer surface of the display rack is provided with at least one first item placement slot for exhibiting products. The upper side surface and the lower side surface of the inner surface of the display rack are provided with a connector and a groove respectively, the connector is provided with a first threaded hole, and the groove wall of the groove is provided with a second threaded hole. In the present invention, by modular design, a plurality of identical display racks are combined and superposed to form display devices of different width or height, less molds are used in production, so the production efficiency is increased, and production costs are reduced.

8 Claims, 11 Drawing Sheets

(56) References Cited

U.S. PATENT DOCUMENTS

| | | | | |
|---|---|---|---|---|
| 3,257,154 | A * | 6/1966 | Lewis | A47B 87/0292 312/198 |
| 3,552,817 | A * | 1/1971 | Marcolongo | A47B 87/02 312/107 |
| 3,710,736 | A * | 1/1973 | Biondi | A47B 61/00 109/50 |
| 3,858,528 | A * | 1/1975 | Petersen | A47B 19/00 108/60 |
| 3,993,196 | A * | 11/1976 | Immordino | A47F 1/08 211/59.2 |
| 4,014,597 | A * | 3/1977 | Griffin, Jr. | H04R 1/02 312/7.1 |
| 4,243,279 | A * | 1/1981 | Ackeret | B65D 21/0201 108/64 |
| 4,625,867 | A * | 12/1986 | Guibert | F24C 15/322 126/21 A |
| 6,050,657 | A * | 4/2000 | Hiltzman | A47B 87/007 312/107 |
| 6,105,796 | A * | 8/2000 | Buchanan | A47F 9/04 186/59 |
| 6,189,710 | B1 * | 2/2001 | Mason | A47F 5/05 211/131.1 |
| 6,752,281 | B1 * | 6/2004 | Mason | A47F 5/0018 211/131.1 |
| 6,942,113 | B1 * | 9/2005 | Johnske | A47F 5/112 211/131.1 |
| 7,131,543 | B2 * | 11/2006 | Mason | A47F 5/0018 211/59.2 |
| 7,762,410 | B2 * | 7/2010 | Colin | A47F 5/10 108/107 |
| 7,850,023 | B2 | 12/2010 | Silveria | |
| 9,084,480 | B2 * | 7/2015 | Atwood | A47B 47/042 |
| 9,125,503 | B2 * | 9/2015 | Hawkins | A47F 5/0025 |
| 9,638,233 | B1 * | 5/2017 | McClure | F16B 2/12 |
| 2008/0237169 | A1 * | 10/2008 | May | A47B 23/00 211/195 |
| 2014/0227570 | A1 * | 8/2014 | Hoshi | H01M 2/1077 429/90 |
| 2015/0291271 | A1 * | 10/2015 | Benner | B64C 1/069 403/376 |
| 2017/0215606 | A1 * | 8/2017 | McKee | A47F 5/02 |
| 2018/0168337 | A1 * | 6/2018 | Arriagada Lama | A47F 5/00 |

* cited by examiner

DISPLAY RACK FOR DISPLAY AND EXHIBITION AND DISPLAY DEVICE

CROSS REFERENCE TO RELATED APPLICATIONS

The present application is a Continuation-In-Part Application of PCT Application No. PCT/CN2018/103552 filed on Aug. 31, 2018, which claims the benefit of Chinese Patent Application No. 201821287469.8 filed on Aug. 9, 2018. All the above are hereby incorporated by reference.

TECHNICAL FIELD

The present invention relates to the technical field of exhibition racks, particularly to a display rack for display and exhibition and a display device comprising the display rack.

BACKGROUND

Exhibition racks on the market at present are formed by assembling a plurality of components of different structures in general, and each component corresponds to one mold, so that when the current exhibition racks are produced, there is a need to manufacture a plurality of molds. In this way, not only the production efficiency is reduced, but also production costs are increased.

SUMMARY

To solve the problem existing in the prior art, the main object of the present invention is to provide a display rack for display and exhibition with the advantages of high production efficiency and low costs.

To achieve the above purpose, the present invention adopts the following technical solution:

The present invention provides a display rack for display and exhibition. Both sides of the display rack are provided with at least one insertion plate and at least one insertion slot respectively, and the outer surface of the display rack is provided with at least one first item placement slot for exhibiting products.

Preferably, the upper side surface and the lower side surface of the inner surface of the display rack are provided with a connector and a groove respectively, the connector is provided with a first threaded hole, and the groove wall of the groove is provided with a second threaded hole corresponding to the first threaded hole.

Preferably, the upper end surface and the lower end surface of the display rack are provided with a snap-fitting slot and a snap-fitting buckle respectively.

Preferably, the display rack further comprises an item placement assembly, wherein the item placement assembly comprises an item placement box disposed in the first item placement slot.

Preferably, the item placement assembly further comprises a hook, wherein the outer surface of the display rack is provided with a second item placement slot on either side of the first item placement slot, and the hook is disposed in the second item placement slot.

Preferably, the first item placement slot is obliquely disposed and has an oblique angle of 5°-20°.

Preferably, the upper part of the slot bottom of the first item placement slot is provided with a spacing plate.

Preferably, the lower part of the slot bottom of the item placement slot is provided with a wedge-shaped spacing piece.

Accordingly, the present invention further provides a display device, the display device comprising a display rack group, fixed trays and fixed plates, wherein at least two fixed plates are disposed and are vertically disposed on the display rack group, and the fixed trays are located at the upper end and the lower end of the display rack group and are in insertion connection with the at least two fixed plates; and the display rack group is formed by inserting and combining at least two of the display racks by adjacent insertion slots and insertion plates in the peripheral direction.

Preferably, the upper end surface and the lower end surface of the display rack are provided with a snap-fitting slot and a snap-fitting buckle respectively, and the display rack group is formed by inserting and combining any two display racks adjacent in the vertical direction by the snap-fitting slot and the snap-fitting buckle.

Preferably, the upper side surface and the lower side surface of the inner surface of the display rack are provided with a connector and a groove respectively, the connector is provided with a first threaded hole, and the groove wall of the groove is provided with a second threaded hole corresponding to the first threaded hole; and at least two of the display racks disposed in the peripheral direction are inserted and combined by the correspondingly disposed connector and groove and fixed by screws.

Preferably, first spacing bulges are respectively disposed at the upper end and the lower end of the fixed plate, and the fixed tray is provided with first spacing holes corresponding to the first spacing bulges.

Preferably, both sides of the display rack are provided with locating slots for disposing the fixed plates.

Preferably, the side surface of the fixed plate mating with the locating slot is provided with a second spacing bulge, and a second spacing hole corresponding to the second spacing bulge is provided in the locating slot.

Preferably, the display device further comprises a nameplate, wherein the nameplate is located on the fixed tray at the upper end of the display rack group.

Preferably, the display device further comprises a rotating tray, wherein the rotating tray is fixed to the lower part of the fixed tray at the lower end of the display rack group.

Compared with the prior art, both sides of the display rack of the present invention are provided with at least one insertion plate and at least one insertion slot respectively, and the outer surface of the display rack is provided with at least one first item placement slot for exhibiting products; in the present invention, by modular design, a plurality of identical display racks are combined and superposed to form display devices of different width or height, less molds are used in production, so the production efficiency is increased, and production costs are reduced.

Legends: 1. display rack; 11. insertion plate; 12. insertion slot; 13. connector; 131. first threaded hole; 14. groove; 141. second threaded hole; 15. snap-fitting slot; 16. snap-fitting buckle; 17. item placement chamber; 171. first item placement slot; 1711. spacing plate; 1712. wedge-shaped spacing piece; 172. second item placement slot; 18. locating slot; 100. display rack group; 2. item placement box; 21. upper box body; 22. lower box body; 3. hook; 4. fixed tray; 41. first spacing hole; 42. locating notch; 5. fixed plate; 51. first spacing bulge; 52. second spacing bulge; 6. nameplate; 7. rotating tray; 53 second spacing hole.

DETAILED DESCRIPTION

To make the purpose, the technical solution and the advantages of the present invention more clear, the present invention will be further described below in detail in combination with the drawings and the embodiments. It should be understood that specific embodiments described herein are only used for explaining the present invention, not used for limiting the present invention.

Embodiment 1

Figure 1:
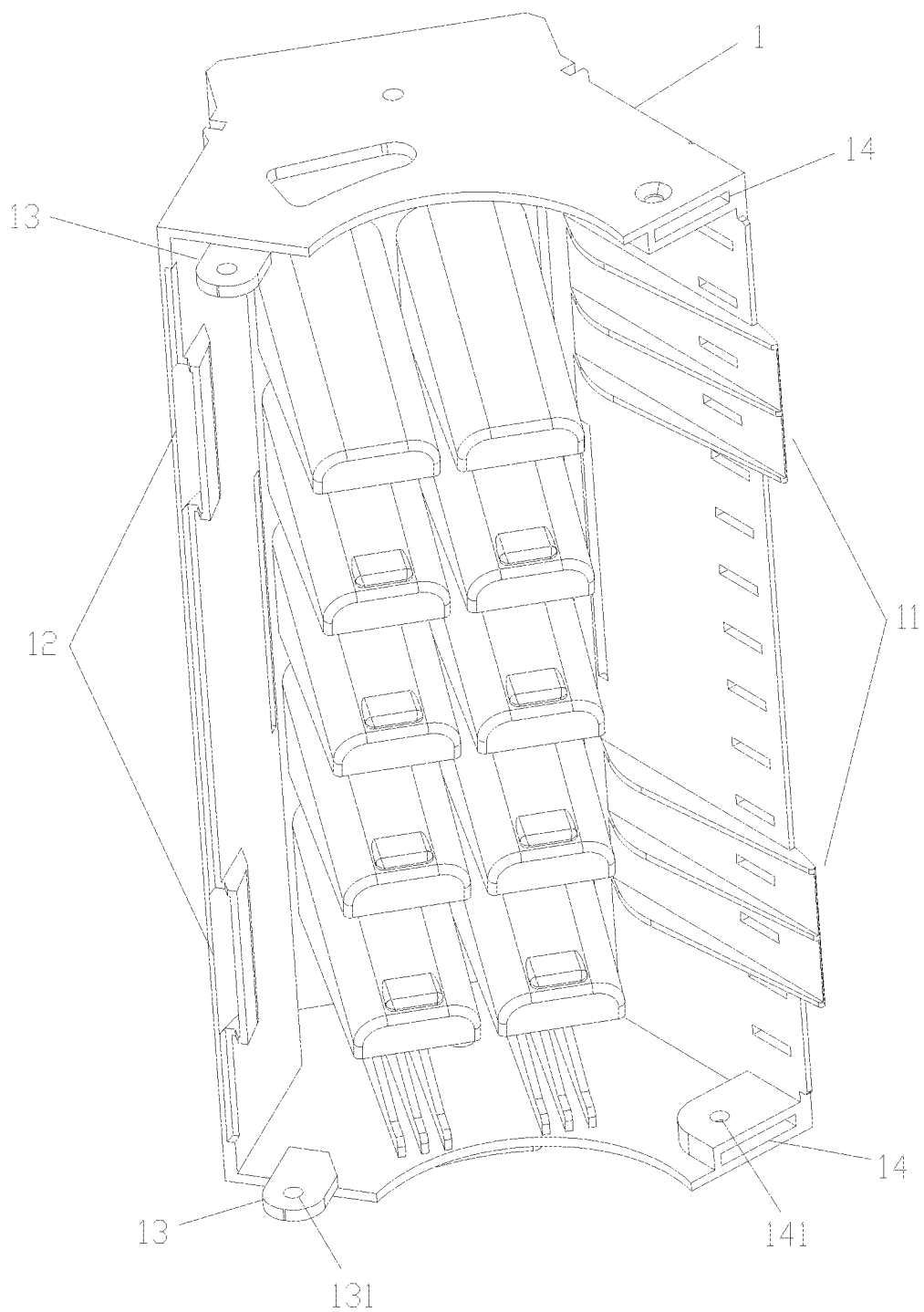
FIG. 1 is a three-dimensional view of a display rack in embodiment 1 of the present invention.
Figure 2:
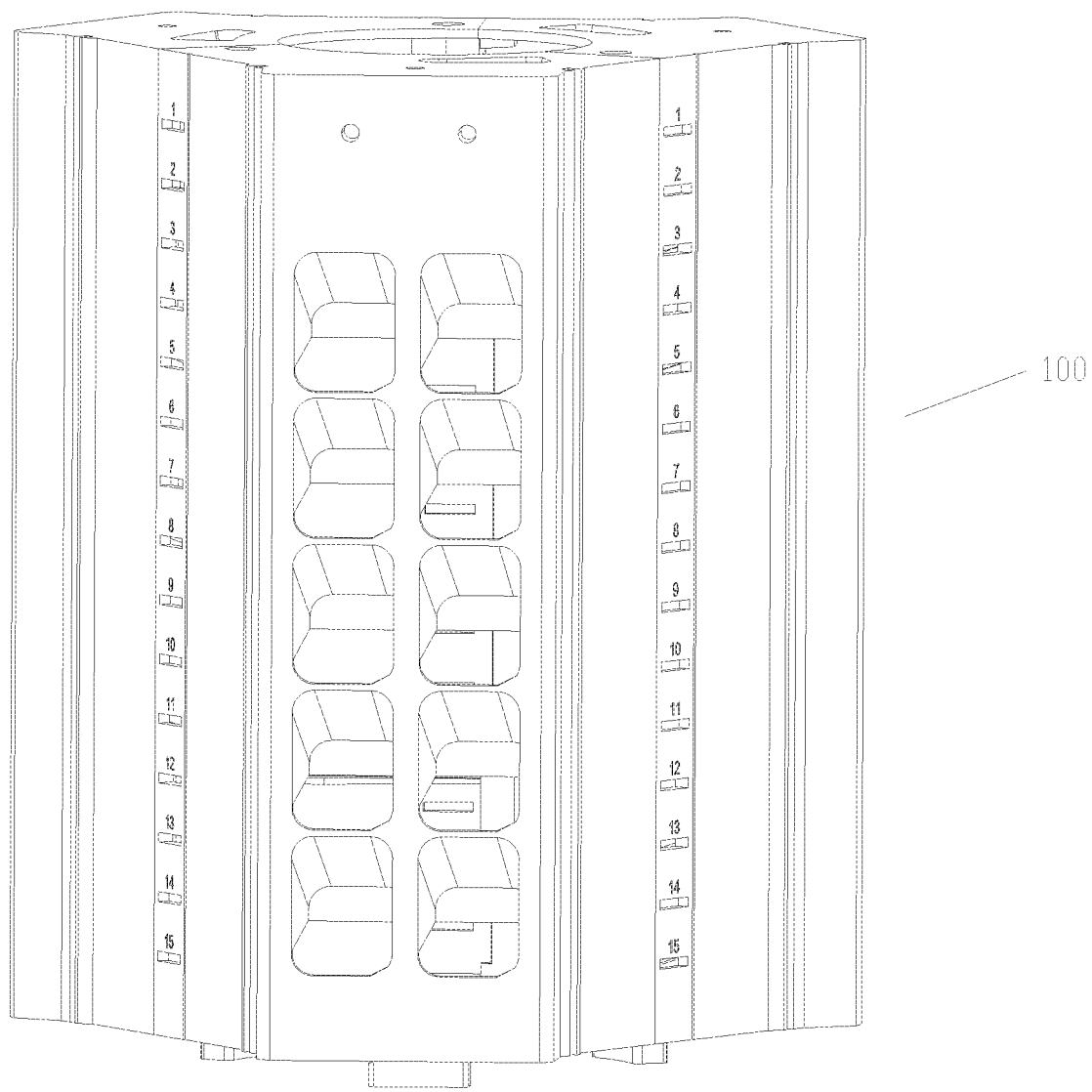
FIG. 2 is a three-dimensional view of a display rack group in embodiment 1 of the present invention.

As shown in FIG. 1, embodiments of the present invention disclose a display rack 1 for display and exhibition. The left side and the right side of the display rack 1 are provided with an insertion plate 11 and an insertion slot 12 respectively, the upper side surface and the lower side surface of the inner surface of the display rack 1 are provided with a connector 13 and a groove 14 respectively, the connector 13 is provided with a first threaded hole 131, and the groove wall of the groove 14 is provided with a second threaded hole 141 corresponding to the first threaded hole 131. Thus, all the display racks 1 can be inserted and combined by the insertion slot 12 and the insertion plate 11 to form a display rack group 100, as shown in FIG. 2. Meanwhile, the connector 13 is inserted in the groove 14 of an adjacent display rack 1 and is fixed by screws so that the display rack group 100 is firmer.

Figure 3:
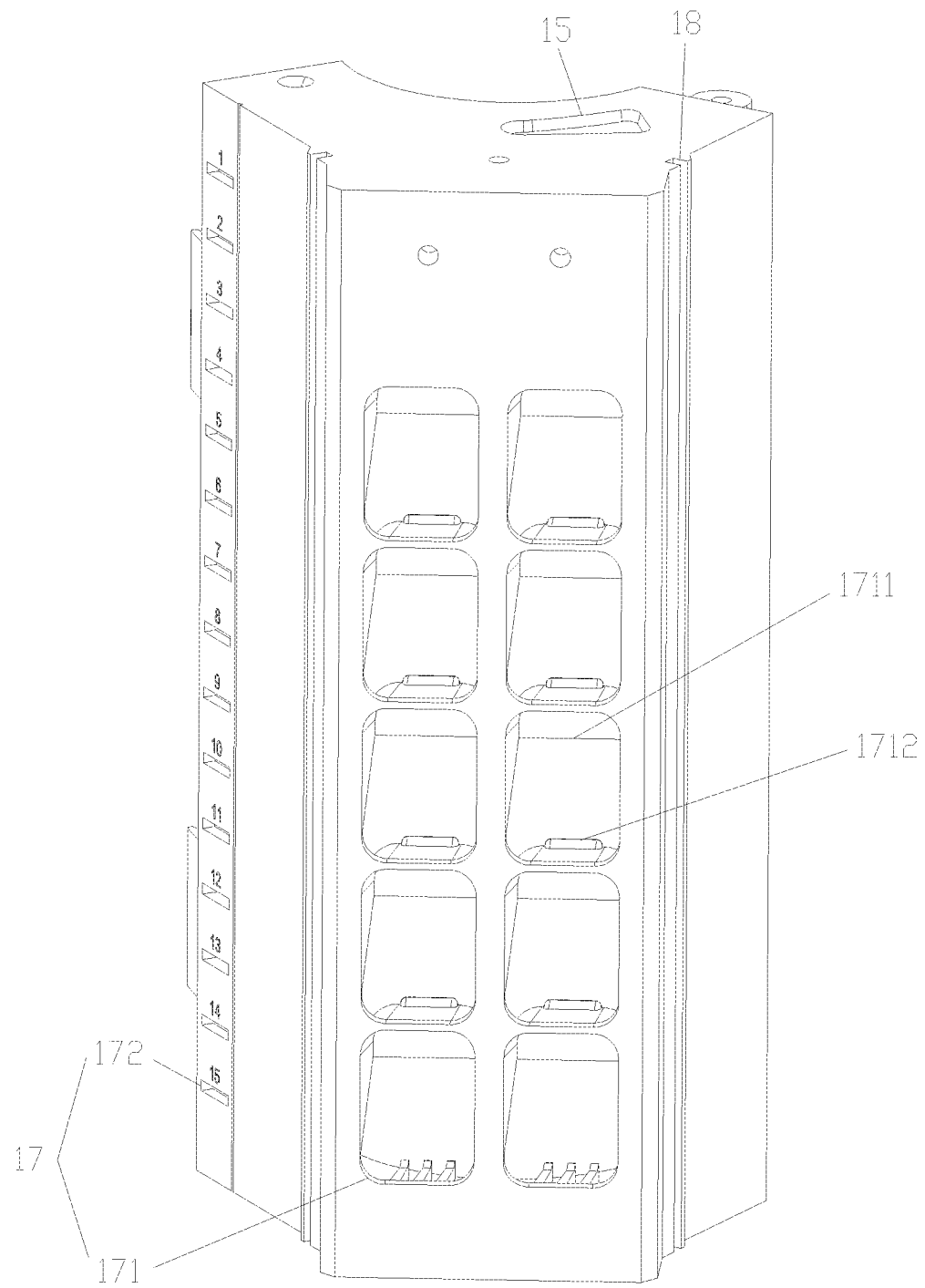
FIG. 3 is a three-dimensional view of a display rack in embodiment 1 of the present invention viewed at another angle.
Figure 4:
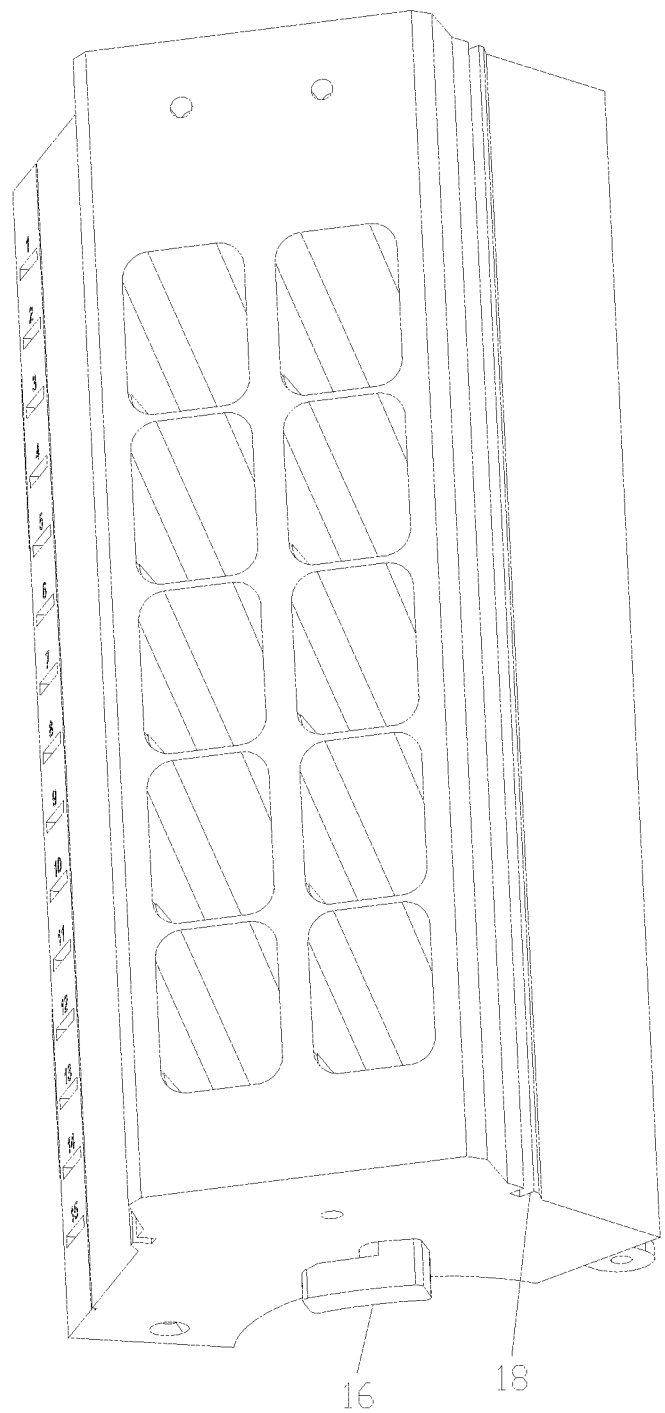
FIG. 4 is a three-dimensional view of a display rack in embodiment 1 of the present invention viewed at another angle.

As shown in FIG. 3 and FIG. 4, the upper end surface of the display rack 1 is provided with a snap-fitting slot 15, the lower end surface of the display rack 1 is provided with a snap-fitting buckle 16, and two display racks 1 are snap-fitted and superposed by the snap-fitting slot 15 and the snap-fitting buckle 16. Specifically, when two assembled one-layer display rack groups 100 are superposed to form a two-layer display rack group, the snap-fitting buckle 16 at the bottom of the second layer of display rack group is inserted in the snap-fitting slot 15 at the top of the first layer of display rack group first, and then the second layer of display rack group is rotated so that the second layer of display rack group is aligned with the first layer of display rack group. For the convenience of installation, the width of the snap-fitting slot 15 is slightly greater than that of the snap-fitting buckle 16, and the width of the snap-fitting slot 15 changes from large to small in the direction of rotation of the second layer of display rack group.

Figure 5:
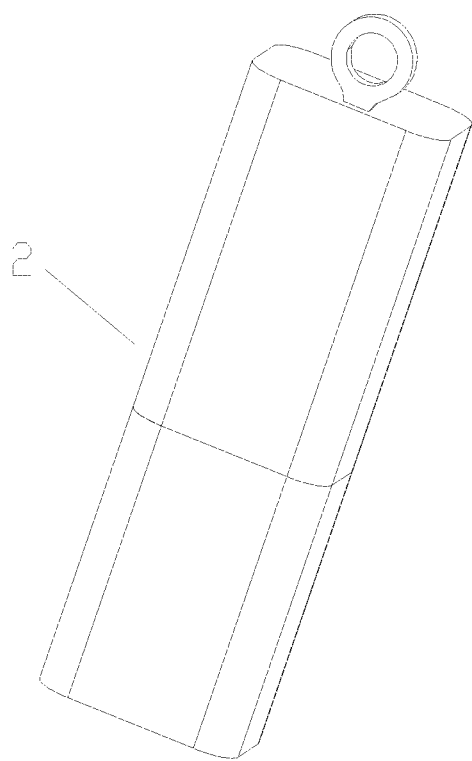
FIG. 5 is a three-dimensional view of an item placement box in embodiment 1 of the present invention.
Figure 6:
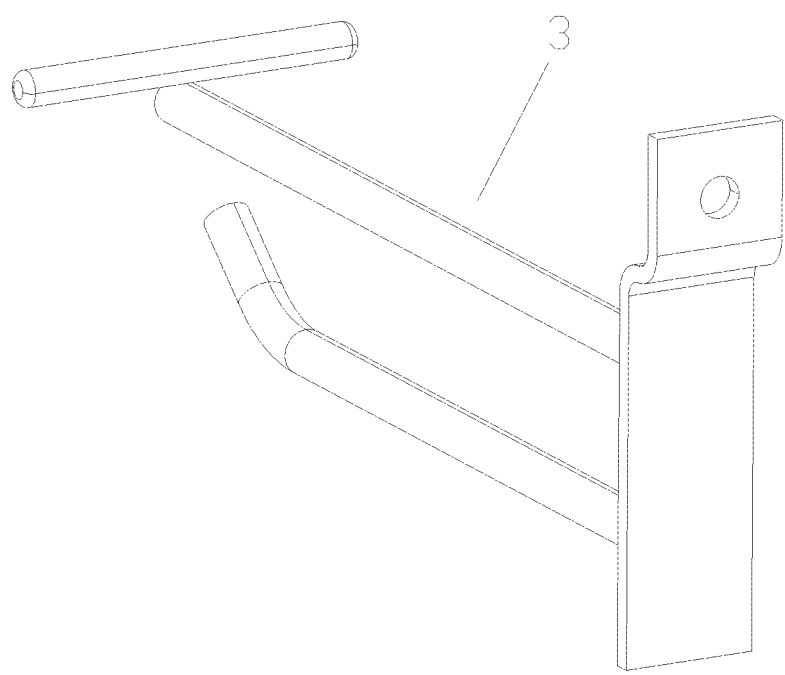
FIG. 6 is a three-dimensional view of a hook in embodiment 1 of the present invention.

As shown in FIG. 5 and FIG. 6, the display rack further comprises an item placement assembly for placing exhibited products (such as car charger, earphone), wherein the item placement assembly comprises an item placement box 2 and a hook 3. The outer surface of the display rack 1 is provided with an item placement chamber 17, the item placement chamber 17 including a first item placement slot 171 and a second item placement slot 172, the item placement box 2 is disposed in the first item placement slot 171, and the hook 3 is mounted in the second item placement slot 172. To make the item placement box 2 be placed in the first item placement slot 171 more firmly, the first item placement slot 171 is obliquely disposed and has an oblique angle of 5°-20°. To prevent the item placement box 2 from falling off from the slot bottom of the first item placement slot 171, the upper part of the slot bottom of the first item placement slot 171 is provided with a spacing plate 1711, and the lower part of slot bottom of the first item placement slot 171 is provided with a wedge-shaped spacing piece 1712.

Figure 7:
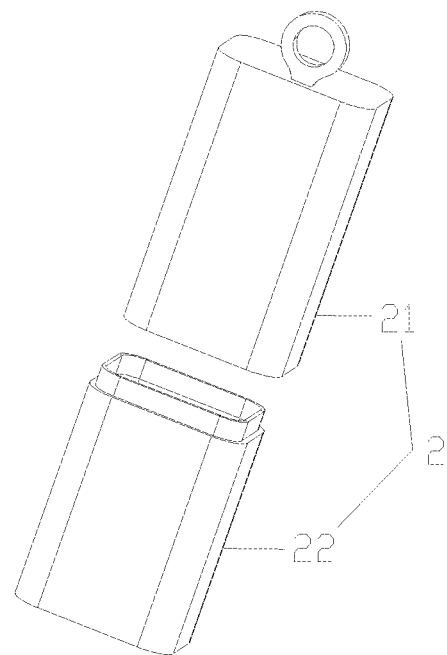
FIG. 7, FIG. 8 and FIG. 9 are exploded views of an item placement box of three structures in embodiment 1 of the present invention.
Figure 8:
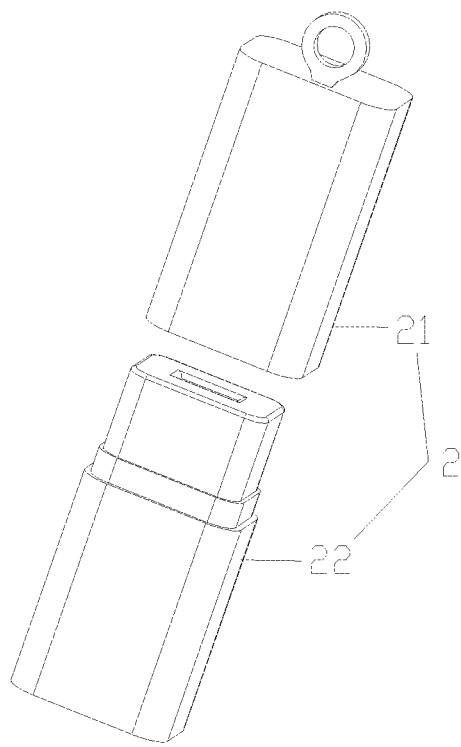
Figure 9:
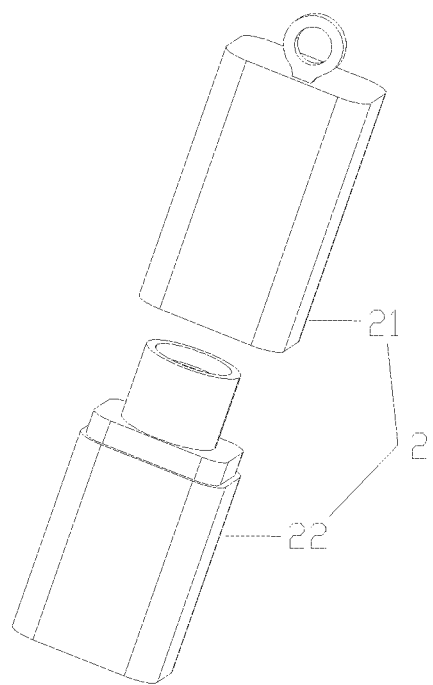

In this embodiment, the item placement box 2 has three structures in total, the item placement box 2 of the three structures has the same length, width and height respectively, and the item placement box 2 of each structure comprises an upper box body 21 and a lower box body 22, wherein the box body 21 and the lower box body 22 are fixed by snap-fitting, as shown in FIG. 7, FIG. 8 and FIG. 9.

Embodiment 2

Figure 10:
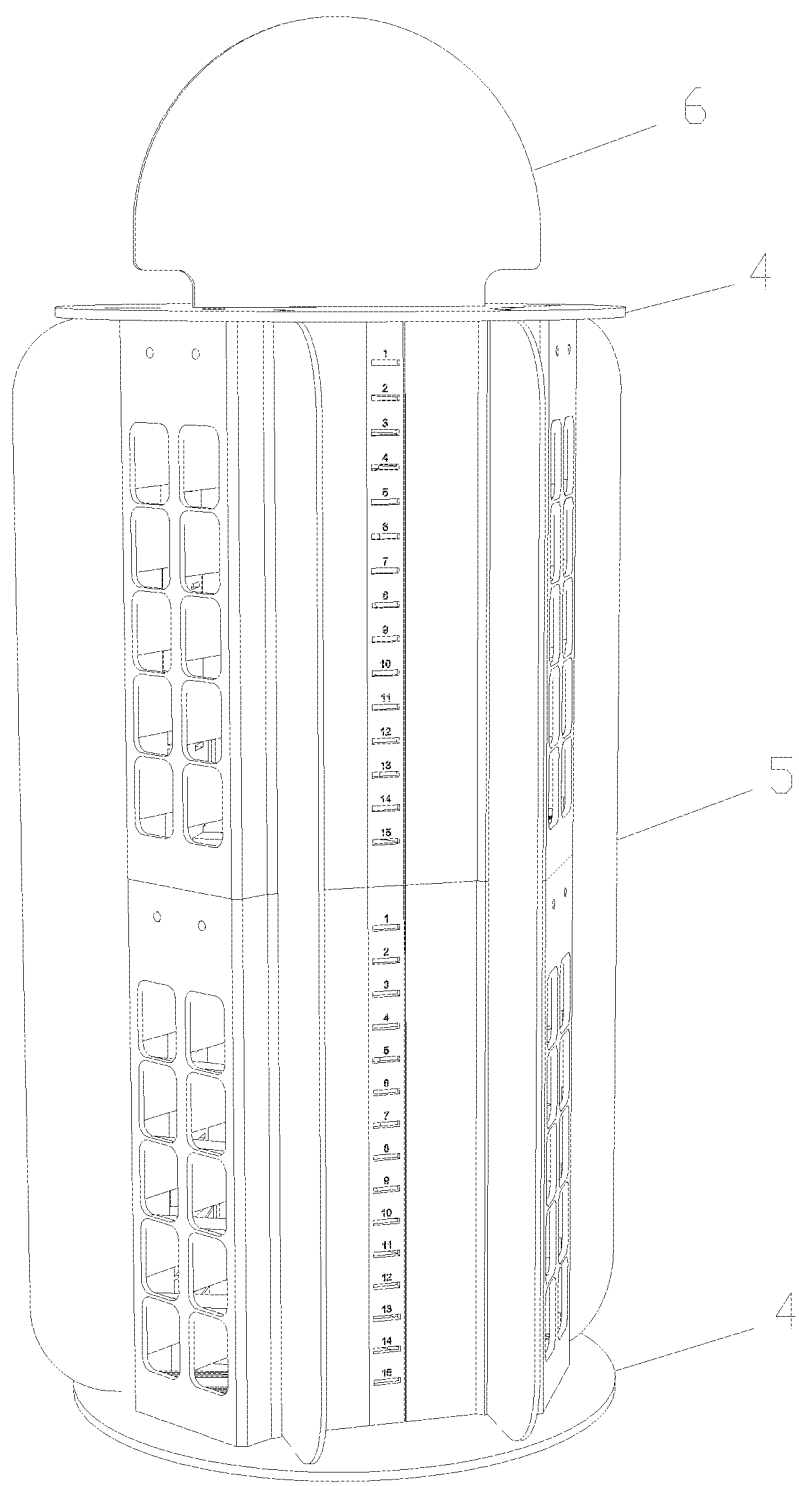
FIG. 10 is a three-dimensional assembling view of a two-layer display device in embodiment 2 of the present invention.
Figure 11:
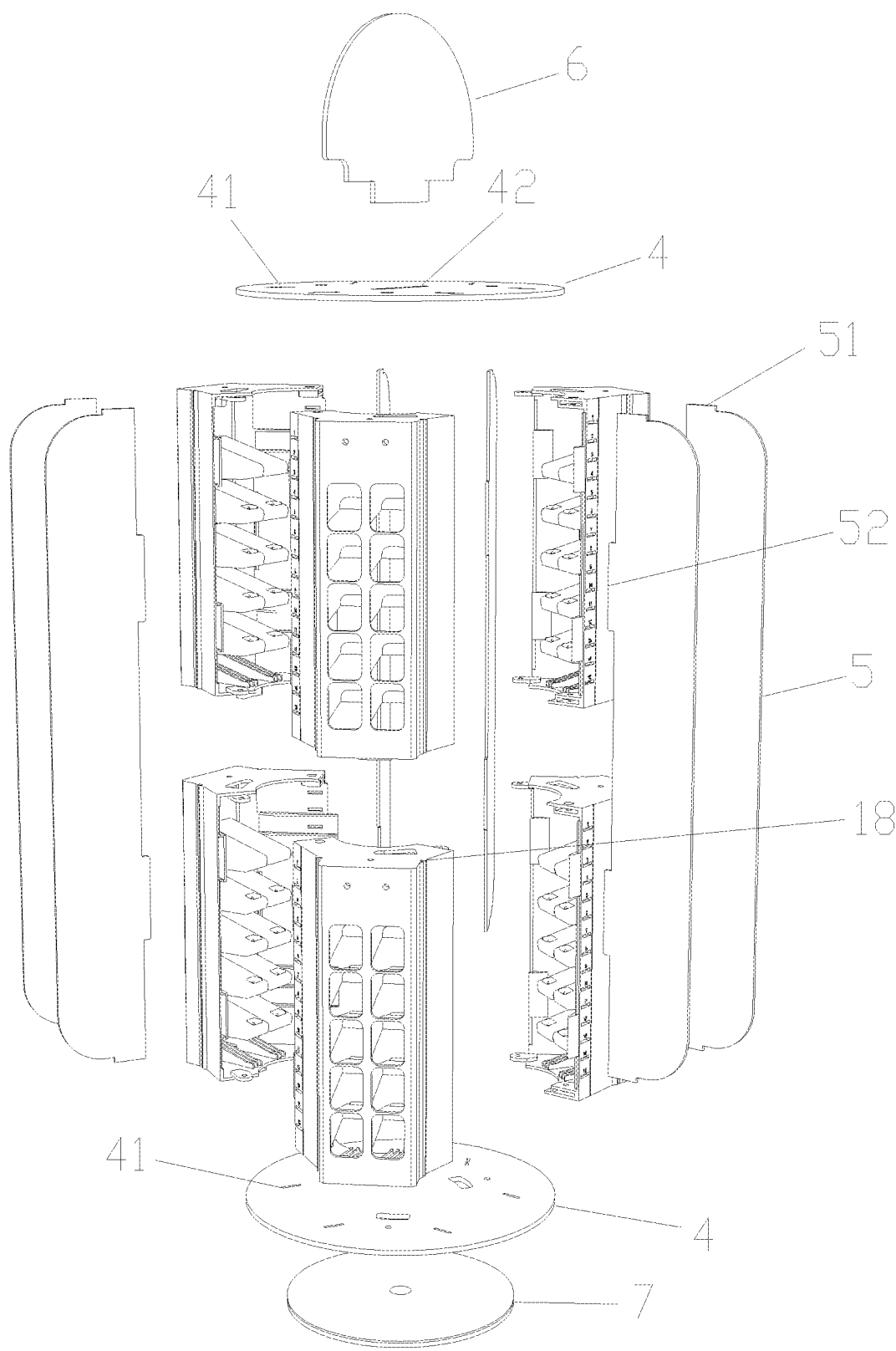
FIG. 11 is a three-dimensional exploded view of a two-layer display device in embodiment 2 of the present invention.

As shown in FIG. 10 and FIG. 11, embodiments of the present invention disclose a display device, the display device comprising fixed trays 4, a fixed plate 5 and six display racks, wherein the display racks are display racks 1 described in embodiment 1, and the six display racks 1 are combined to form display rack groups. Wherein, every three display racks 1 are pairwise inserted in each other by the insertion plate 11 and the insertion slot 12 in the peripheral direction to form a one-layer display rack group 100, and two adjacent display racks 1 are inserted and combined by the connector 13 and the groove 14 and fixed by screws. Two one-layer display rack groups 100 are combined by the snap-fitting slot 15 and the snap-fitting buckle 16 in the vertical direction to form a two-layer display rack group.

The fixed trays 4 are disposed at the upper end and the lower end of the display rack group respectively, the fixed plate 5 is vertically disposed on the display rack group and the upper end and the lower end of the fixed plate 5 are in insertion connection with the fixed trays 4 respectively, and the inner side of the fixed plate 5 is in insertion connection with the display rack. Specifically, the fixed tray 4 is provided with a first spacing hole 41, the outer surface of the display rack 1 is provided with a locating slot 18, and a second spacing hole 53 is provided in the locating slot 18. The fixed plate 5 is provided with a first spacing bulge 51 and a second spacing bulge 52 respectively corresponding to the first spacing hole 41 and the second spacing hole 53. During specific assembling, the fixed plate 5 is disposed in the locating slot 18, the first spacing bulge 51 is inserted in the first spacing hole 41, and the second spacing bulge 52 is inserted in the second spacing hole 53, thereby further stabilizing the display rack group and preventing the display rack group from rotating in the horizontal direction.

In order to better promote the brand of a company, the display device further comprises a nameplate 6, wherein the fixed tray 4 at the upper end of the display rack group is provided with a locating notch 42, and the nameplate 6 is inserted in the locating notch 42 of the fixed tray 4. Meanwhile, to make the nameplate 6 firmer, both sides of the locating notch 42 in the lower surface of the fixed tray 4 are respectively provided with spacing bumps.

In this embodiment, the display device further comprises a rotating tray 7, wherein the rotating tray 7 is fixed to the lower part of the fixed tray 4 at the lower end of the display rack group, and the display device is conveniently rotated by the rotating tray 7, to better exhibit products.

Embodiment 3

Figure 12:
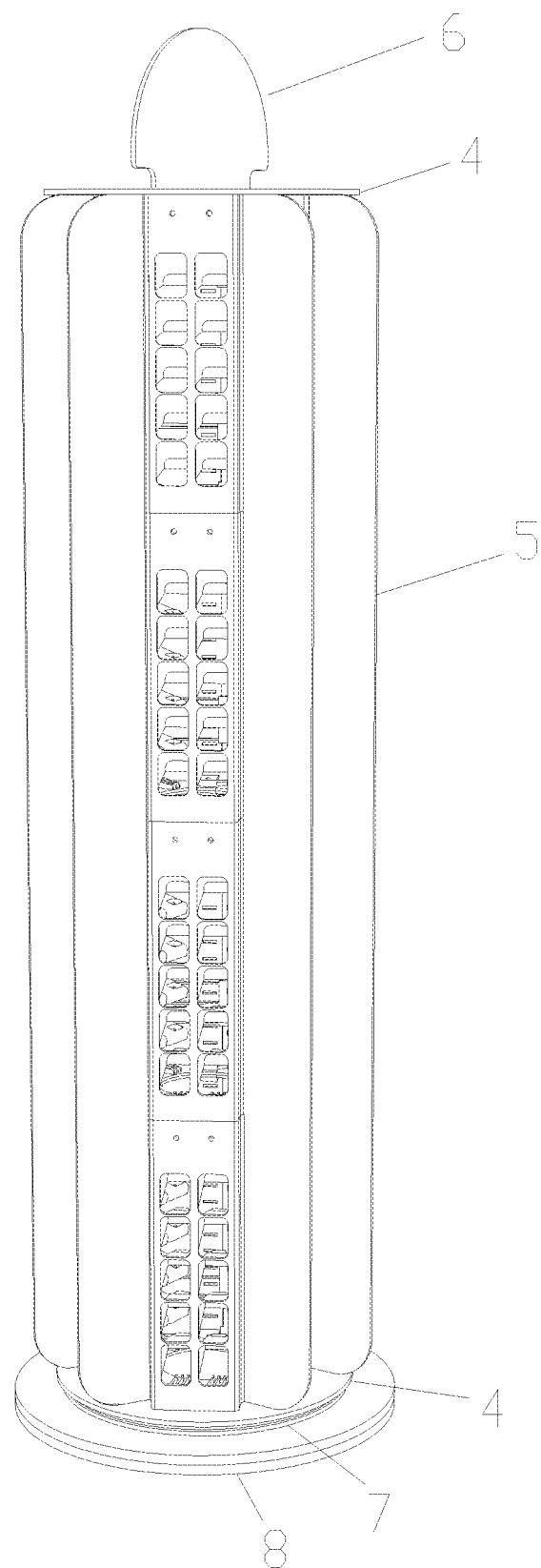
FIG. 12 is a three-dimensional assembling view of a four-layer display device in embodiment 3 of the present invention.
Figure 13:
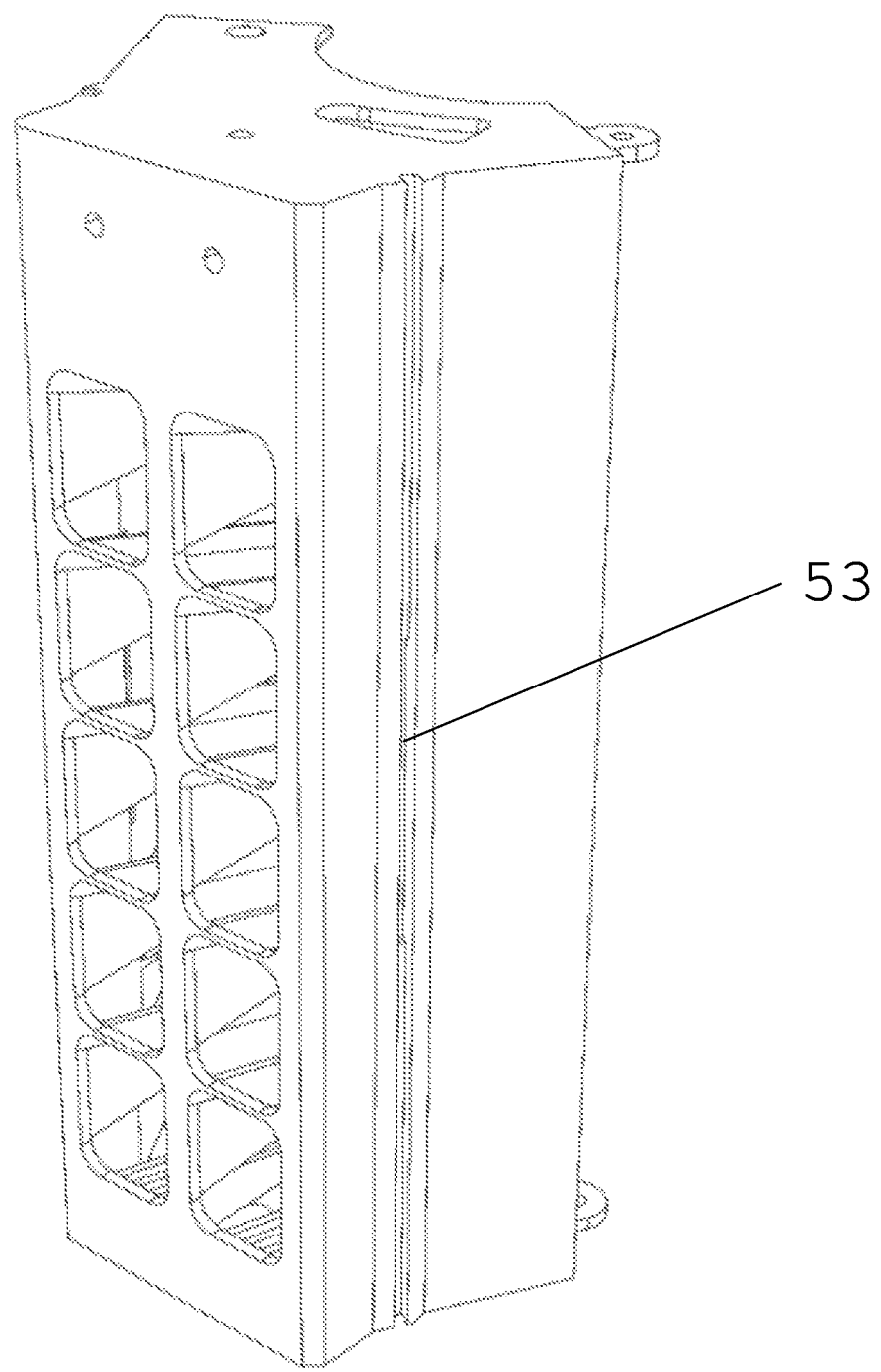
FIG. 13 is a three-dimensional view of a display rack in embodiment 2 of the present invention showing the second spacing hole(s).

The display device in this embodiment is substantially identical to the display device in embodiment 2 in structure, except that the display device in this embodiment is of a four-layer structure, as shown in FIG. 12, and this embodiment further comprises a counter weight base 8, wherein the counter weight base 8 is fixed to the lower part of the rotating tray 7 to prevent the display device from falling due to fact that the display device is too tall and too heavy and then is unstable in center of gravity.

The above are just some concrete embodiments of the present invention, but the protection scope of the present invention is not limited thereto. Any change or replacement contemplated easily by those skilled in the art familiar with the technical field within the technical scope disclosed by the present invention shall be covered within the protection scope of the present invention. Therefore, the protection scope of the present invention should be determined by the protection scope of the claims.

What is claimed is:

1. A display device, comprising a display rack group, fixed trays and fixed plates, wherein at least two fixed plates are disposed and are vertically disposed on the display rack group, and the fixed trays are located at upper end and lower end of the display rack group and are in insertion connection with the at least two fixed plates; and the display rack group is defined by a plurality of display racks, wherein each of the display rack comprising two sides, wherein the two sides are provided with at least one insertion plate and at least one insertion slot respectively for connection with adjacent one of the display racks; wherein the display rack group is formed by inserting and combining at least two of the display racks by adjacent insertion slots and insertion plates thereof in the peripheral direction; and an outer surface of each of the display rack is provided with at least one first item placement slot for exhibiting products.

2. The display device according to claim 1, wherein upper end surface and lower end surface of the display rack are provided with a snap-fitting slot and a snap-fitting buckle respectively, and the display rack group is formed by inserting and combining any two display racks adjacent in the vertical direction by the snap-fitting slot and the snap-fitting buckle.

3. The display device according to claim 1, wherein upper side surface and lower side surface of the inner surface of the display rack are provided with a connector and a groove respectively, the connector is provided with a first threaded hole, and groove wall of the groove is provided with a second threaded hole corresponding to the first threaded hole; and at least two of the display racks disposed in the peripheral direction are inserted and combined by the correspondingly disposed connector and groove and fixed by screws.

4. The display device according to claim 1, wherein first spacing bulges are respectively disposed at upper end and lower end of the fixed plate, and the fixed tray is provided with first spacing holes corresponding to the first spacing bulges.

5. The display device according to claim 4, wherein sides of the display rack are provided with locating slots for disposing the fixed plates.

6. The display device according to claim 5, wherein side surface of the fixed plate mating with the locating slot is provided with a second spacing bulge, and a second spacing hole corresponding to the second spacing bulge is provided in the locating slot.

7. The display device according to claim 1, further comprising a nameplate, wherein the nameplate is located on the fixed tray at upper end of the display rack group.

8. The display device according to claim 1, further comprising a rotating tray, wherein the rotating tray is fixed to lower part of the fixed tray at the lower end of the display rack group.

* * * * *